Nov. 20, 1956  J. F. VITCHA ET AL  2,771,308
QUICK CONNECT VALVE
Filed Feb. 23, 1954
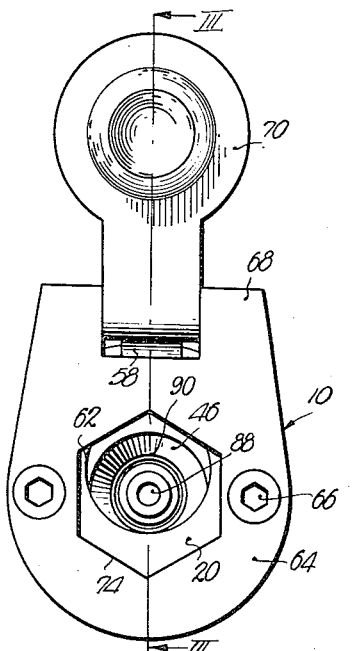
Fig. 1.
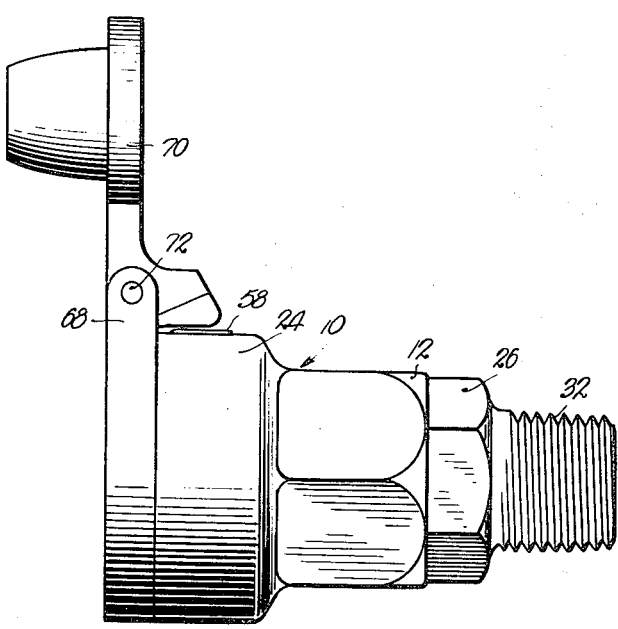
Fig. 2.
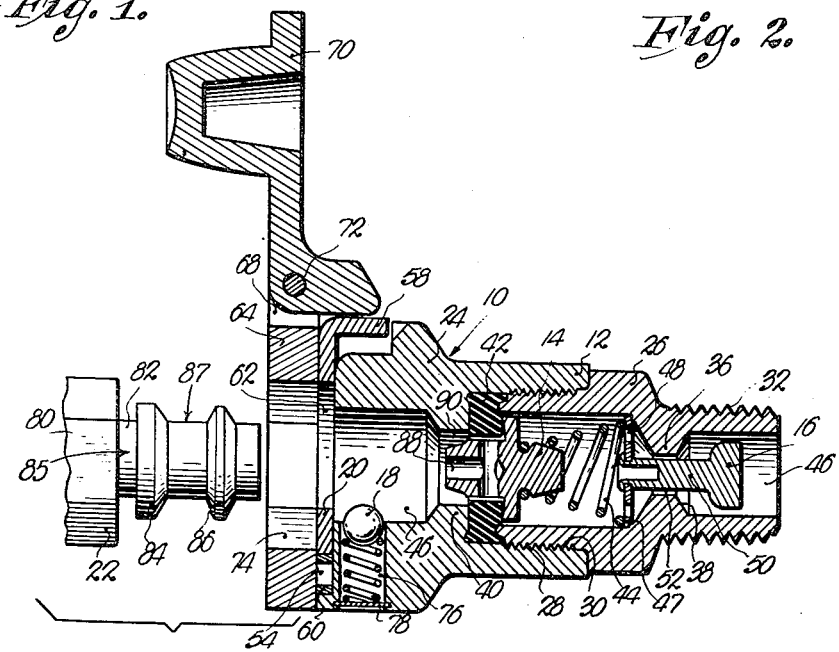
Fig. 3.
INVENTORS.
James F. Vitcha
Arley C. Hemeyer
BY
ATTORNEY.

United States Patent Office 2,771,308
Patented Nov. 20, 1956

2,771,308

QUICK CONNECT VALVE

James F. Vitcha, Prairie Village, and Arley C. Hemeyer, Overland Park, Kans., assignors to Puritan Compressed Gas Corporation, Kansas City, Mo., a corporation of Missouri Application February 23, 1954, Serial No. 412,016

4 Claims. (Cl. 284—19)

This invention relates generally to fluid flow systems and particularly to a valve assembly which is actuated by the insertion within the valve of the stem of a fluid line leading to a point of fluid discharge.

The most important object of the present invention is the provision of primary and secondary stem locking structure within the socket of such a valve assembly for holding the stem in place, the secondary locking structure being in the nature of an "anti-spit" device for preventing ejection of the stem from the valve assembly by the seating action of the valve upon release of the primary locking structure.

Another important object of the present invention is to provide a stem having spaced abutments which are successively engaged by the primary and secondary locking structures and having an extension beyond the abutments which, upon insertion of the stem, engages and unseats the head of the valve itself.

A further important object of the present invention is the provision of latch means exteriorly of the valve assembly for actuating the primary locking structure to release the stem.

With these and other objects in view, this invention generally comprises an elongated, hollow valve body having an interior, annular valve seat, a spring-loaded valve head normally bearing against the valve seat, an elongated stem for actuating the valve and permitting a flow of pressurized fluid through the valve and stem, and locking structure for holding the stem within the body of the valve both when the valve is actuated and after seating of the valve when the stem has been partially removed from the body.

Additional, more minor objects of the present invention, including the use of interchangeable parts adapting the entire valve assembly for use with various fluids having different characteristics; the manner of providing a valve body made up of interconnected sections; and the provision of a second valve head and seat within one of the sections of the body which second valve head is closed only when the sections are uncoupled will become apparent as the following specification progresses, reference being had to the accompanying drawing, wherein:

Figure 1 is an end elevational view of a quick-connect valve made in accordance with the present invention.

Fig. 2 is a side elevational view thereof; and

Fig. 3 is a longitudinal cross-section of the quick-connect valve of the present invention, with one end of the stem from a service line shown partially.

The improvements forming the subject matter of the present invention, as illustrated in the drawing, are incorporated in a valve assembly broadly designated by the numeral 10.

The valve assembly 10 includes an elongated valve body 12, valves 14 and 16, ball detent 18, latch plate 20 and a specially formed stem 22.

Valve body 12 consists of separable sections 24 and 26. Section 24 is internally threaded as at 28 to receive the threaded end 30 of section 26. Section 26 is threaded at its opposite end, as at 32, and thereby adapted for insertion in a supply line (not shown) leading from a pressure controlled source of gas or other fluid. Section 26 is additionally provided with an internal annular flange 36, providing a valve seat 38 for valve head 16.

Section 24 is provided with an internal annular shoulder 40, adjacent threaded portion 28 thereof, which seats packing ring 42 when sections 24 and 26 are coupled, as shown in Fig. 3 of the drawing.

Valve head 14 normally bears against packing ring 42, and is held biased in that position by spring 44, within bore 46 of valve body 12. A disc 47 having apertures 48 therein, provides a seat for one end of spring 44, and the disc 46 is, therefore, normally held biased against the flange 36, on the opposite side thereof from valve seat 38. Disc 46 is rigidly attached to the stem 50 of valve 16, the stem 50 being freely reciprocable within the reduced portion 52 of bore 46.

A slot 54, in one end of section 24, reciprocably receives latch plate 20, the latter having a lateral extension 58. A leaf spring 60, within slot 54, and beneath latch plate 20, holds latch plate 20 normally biased upwardly. When the latch plate 20 is moved downwardly within slot 54, against the action of spring 60, an opening 62 in the latch plate 20 is in alignment with the bore 46 of valve body 12.

End plate 64 is rigidly attached to section 24, by means of fastening elements 66, and includes upstanding ears 68, between which is pivotally secured actuator 70. When the actuator 70 is swung about the axis 72, in a clockwise direction (viewing Fig. 3) it engages extension 58 of latch plate 20, and depresses the latter against the action of leaf spring 60. End plate 64 has a central opening 74 therein, which opening 74 serves as a socket for stem 22.

A radial cavity 76, in section 24, receives ball detent 18 and spring 78. The cavity 76 is restricted at its point of juncture with the bore 46 to limit the extent of movement of detent 18 within bore 46.

The stem 22, having an elongated fluid passage (not shown) therein, has a central portion 80 of the same configuration as the opening 74 of end plate 64. The end portion 82 of stem 22 is of the same diameter as the reduced portion 90 of bore 46 within shoulder 40. End portion 82 is provided with shoulders 84 and 86, presenting a groove 85 for plate 20 and a groove 87 for detent 18. The shoulder 86 slopes downwardly to end portion 82 on both sides thereof, whereas the shoulder 84 is flat on one side and slopes downwardly to end portion 82 on the other side thereof.

In operation, the stem 22 is inserted into the bore 46, until the end portion 82 thereof engages valve 14 and unseats the latter, against the action of spring 44. As the stem 22 is inserted into the bore 46, the leading, sloping side of shoulder 86 engages latch plate 20, and forces the latter downwardly, against the action of spring 60, to permit passage of shoulder 86. Shoulder 86, under the pressure of insertion, also engages ball detent 18 and forces the latter downwardly, against the action of spring 78, to permit passage of the shoulder 86. Similarly, the sloping side of shoulder 84 also engages latch plate 20, to depress the latter, but the flat side of shoulder 84, after passing latch plate 20, engages the latter, and is held thereagainst by the action of spring 44 acting on valve 14. With the stem 22 thus locked within the socket 74 and the bore 46, fluid from the pressurized source is free to flow around valve 14, through the passage 88 and the stem 22 to the point of discharge.

When latch plate 20 is pressed downwardly by actuator 70, the flat side of shoulder 84 is no longer in engagement with the latch plate 20. Consequently, spring 44 acts to seat valve 14, which movement is also transferred to end portion 82 of stem 22. After valve 14 has seated, ball detent 18 engages the shoulder 86 with sufficient force to prevent automatic ejection of the stem 22 from the bore 46, the ball detent 18 having been in engagement with the sloping side of shoulder 84 when the valve was seated. When slight additional pressure is exerted on stem 22 to remove the same from the bore 46, the ball detent 18 and latch plate 20 ride over the sloping shoulder 86, against the action of springs 78 and 60, and can be withdrawn from the socket 74.

It is thus seen that a double lock structure for quick-connect valves has been provided which permits easy insertion of the stem 22 into the valve body 12. Swinging movement of actuator 70 causes reciprocation of latch plate 20 within slot 54 and consequent automatic movement of the stem 22, as well as seating of the valve 14. The provision of a second shoulder 86 on end portion 82 of stem 22 and of ball detent 18 within cavity 76 of section 24 prevents, however, the possibility of stem 22 being ejected from the valve body 12 until the operator has exerted the slight additional pressure necessary to move shoulder 86 beyond ball detent 18 and latch plate 20.

It is contemplated that the valve assembly 10 will be utilized in situations where it is desirable to have a plurality of fluid outlets, all of which are supplied by a common pressurized source. Since, at the same time, other systems may be in use for fluids having entirely different characteristics, it is necessary to insure that stems 22 are used only with the particular fluid system intended. To accomplish this end, it is only necessary that the central portions 80 of stems 22 differ according to the system with which they are to be employed, since the portions 80 are of the same configuration as the openings 74 of end plates 64. By providing different configurations for each system employed it is impossible for an operator to interchange systems.

If it becomes necessary to uncouple sections 24 and 26 of valve body 12, for maintenance purposes, the tension of spring 44 on disc 46 is removed, and valve 16 is closed by the fluid pressure in the supply line. In this manner, one of the plurality of valve assemblies 10 can be dismantled without the necessity of closing down the entire delivery system.

It is apparent that many changes and modifications may be made to the valve assembly and double lock structure of the present invention without departing from the spirit thereof, and it is, therefore, desired to be limited only by the scope of the appended claims.

Having thus described the invention, what is claimed as new and desired to be secured by Letters Patent is:

1. In a quick connect valve assembly, a valve body provided with a bore; a valve in the bore; a spring in the bore normally biasing the valve toward one end of the bore to a closed position; a stem insertable into the bore at said one end thereof, said stem having an innermost end engaging the valve and holding the latter open against the action of said spring when the stem is in the bore; and double-lock mechanism for said stem including a pair of spaced, external shoulders on said stem spaced from said innermost end of the latter, presenting a pair of grooves, a radially-movable latch plate carried by the body and extending into one of said grooves when the stem is holding the valve open for locking the stem against outward movement, and a radially movable, spring-loaded, ball detent carried by the body between the plate and the valve and extending into the other of said grooves when the stem is in the bore, the detent-receiving groove being longer than the diameter of the detent and the shoulder proximal to said innermost end of the stem being spaced inwardly from the detent when the stem is locked by the latch plate whereby the valve spring closes the valve and forces said innermost shoulder against the detent when the plate is withdrawn from the plate-receiving groove.

2. In a quick connect valve assembly, a valve body provided with a bore; a valve in the bore; a spring in the bore normally biasing the valve toward one end of the bore to a closed position; a stem insertable into the bore at said one end thereof, said stem having an innermost end engaging the valve and holding the latter open against the action of said spring when the stem is in the bore; and double-lock mechanism for said stem including a pair of spaced, external shoulders on said stem spaced from said innermost end of the latter, presenting a pair of grooves, a radially-movable latch plate having a stem-receiving opening, said plate being carried by the body and extending into one of said grooves when the stem is holding the valve open for locking the stem against outward movement, a radially movable, spring-loaded, ball detent carried by the body between the plate and the valve and extending into the other of said grooves when the stem is in the bore, the detent-receiving groove being longer than the diameter of the detent and the shoulder proximal to said innermost end of the stem being spaced inwardly from the detent when the stem is locked by the latch plate whereby the valve spring closes the valve and forces said innermost shoulder against the detent when the plate is withdrawn from the plate-receiving groove, and means for shifting the plate to withdraw the same from its groove and align its opening with the bore.

3. In a quick-connect valve assembly as set forth in claim 2, wherein is provided resilient means carried by the body and engaging the plate for yieldably holding the latter biased toward one end of its path of travel and into the plate-receiving groove.

4. In a quick-connect valve assembly as set forth in claim 3, wherein said means for shifting the plate comprises an actuator engageable with said plate exteriorly of the body; and means swingably mounting the actuator on the body for movement to and from a position shifting the plate toward the opposite end of its path of travel against the action of said resilient means.

References Cited in the file of this patent

UNITED STATES PATENTS

| 2,263,293 | Ewald | Nov. 18, 1941 |
| 2,630,337 | Snyder et al. | Mar. 3, 1953 |

FOREIGN PATENTS

| 691,899 | Great Britain | May 20, 1953 |